(12) United States Patent
Wang

(10) Patent No.: US 7,552,227 B2
(45) Date of Patent: Jun. 23, 2009

(54) STREAM SWITCHING BASED ON GRADUAL DECODER REFRESH

(75) Inventor: Ye-Kui Wang, Tampere (FI)

(73) Assignee: Nokia Corporation, Espoo (FI)

( * ) Notice: Subject to any disclaimer, the term of this patent is extended or adjusted under 35 U.S.C. 154(b) by 971 days.

(21) Appl. No.: 10/848,966

(22) Filed: May 19, 2004

(65) Prior Publication Data

US 2005/0021814 A1    Jan. 27, 2005

Related U.S. Application Data

(63) Continuation-in-part of application No. 10/601,320, filed on Jun. 19, 2003, now abandoned.

(51) Int. Cl.
*G06F 15/16* (2006.01)
(52) U.S. Cl. .............. 709/231; 709/203; 709/223; 709/224; 709/232; 709/238
(58) Field of Classification Search .............. 709/203, 709/223, 224, 231, 232, 238
See application file for complete search history.

(56) References Cited

U.S. PATENT DOCUMENTS

| | | | | |
|---|---|---|---|---|
| 5,361,096 A * | 11/1994 | Ohki et al. | ............... | 348/386.1 |
| 5,778,143 A * | 7/1998 | Boyce | ....................... | 386/111 |
| 6,304,295 B1 * | 10/2001 | Krishnamurthy et al. | . | 348/420.1 |
| 6,434,195 B1 * | 8/2002 | Luthra et al. | ........... | 375/240.12 |
| 6,570,922 B1 * | 5/2003 | Wang et al. | ............ | 375/240.12 |
| 6,831,949 B1 * | 12/2004 | Brightwell et al. | ..... | 375/240.12 |
| 6,940,904 B2 * | 9/2005 | Chen et al. | ............. | 375/240.12 |
| 7,046,910 B2 * | 5/2006 | Chen et al. | .................... | 386/68 |
| 7,133,451 B2 * | 11/2006 | Kim et al. | ............. | 375/240.16 |
| 2001/0029548 A1 * | 10/2001 | Srikantan et al. | ............ | 709/250 |
| 2002/0147980 A1 * | 10/2002 | Satoda | ........................ | 725/90 |
| 2005/0021814 A1 * | 1/2005 | Wang | ......................... | 709/231 |

OTHER PUBLICATIONS

ISO/IEC 14496-4:1999(E); ISO/IEC JCT 1/SC 29/WG 11 N3850; "Systems"; Oct. 2000.
ISO/IEC FDIS 14496-10:2003(E); ISO/IEC JTC 1/SC 29/WG 11 N5555; "Advanced Video Coding"; Mar. 2003.
ISO/IEC 14496-12| 15444-12; ISO/IEC JTC 1/SC 29/WG 11 N5295 WG 1 N2779; "ISO Base Media File Format"; Oct. 2002.
ISO/IEC FDIS 14496-14:2003(E); ISO/IEC JTC 1/SC 29/WG 11 MPEG01/5298F; "MP4 file format"; Apr. 2003.
ISO/IEC 14496-15/FCD; ISO/IEC JTC 1/SC 29/WG 11 N5652; "AVC file format"; Mar. 2003.

(Continued)

*Primary Examiner*—Liangche A Wang
(74) *Attorney, Agent, or Firm*—Ware, Fressola, Van Der Sluys & Adolphson, LLP

(57) ABSTRACT

A signaling method and device for use in stream switching in which GDR random access points are used. In order to indicate the GDR switching points in the bitstreams, a Sync Sample Information Box, which is contained in a Sync Sample Box, is used to provide information of such GDR switching points. The information also includes which slice group is the isolated region and which slice group is the leftover region, if slice groups are applied in encoding. The signaling method can be used in video data transmission using Real-time Transport Protocol (RTP), and a Session Description Protocol (SDP) can be used to convey information indicative of the characteristics of the bitstreams.

24 Claims, 4 Drawing Sheets

OTHER PUBLICATIONS

Joint Video Team (JVT) of ISO/IEC MPEG & ITU-T VCEG; JVT-CO73; "Error-Robust Video Coding Using Isolated Regions"; May 2002.
Joint Video Team (JVT) of ISO/IEC MPEG & ITU-T VCEG; JVT-CO74; "Gradual Decoder Refresh Using Isolated Regions"; May 2002.
Joint Video Team (JVT) of ISO/IEC MPEG & ITU-T VCEG; JVT-CO75; "Coding of Masked Scene Transitions Using Isolated Regions"; May 2002.

* cited by examiner

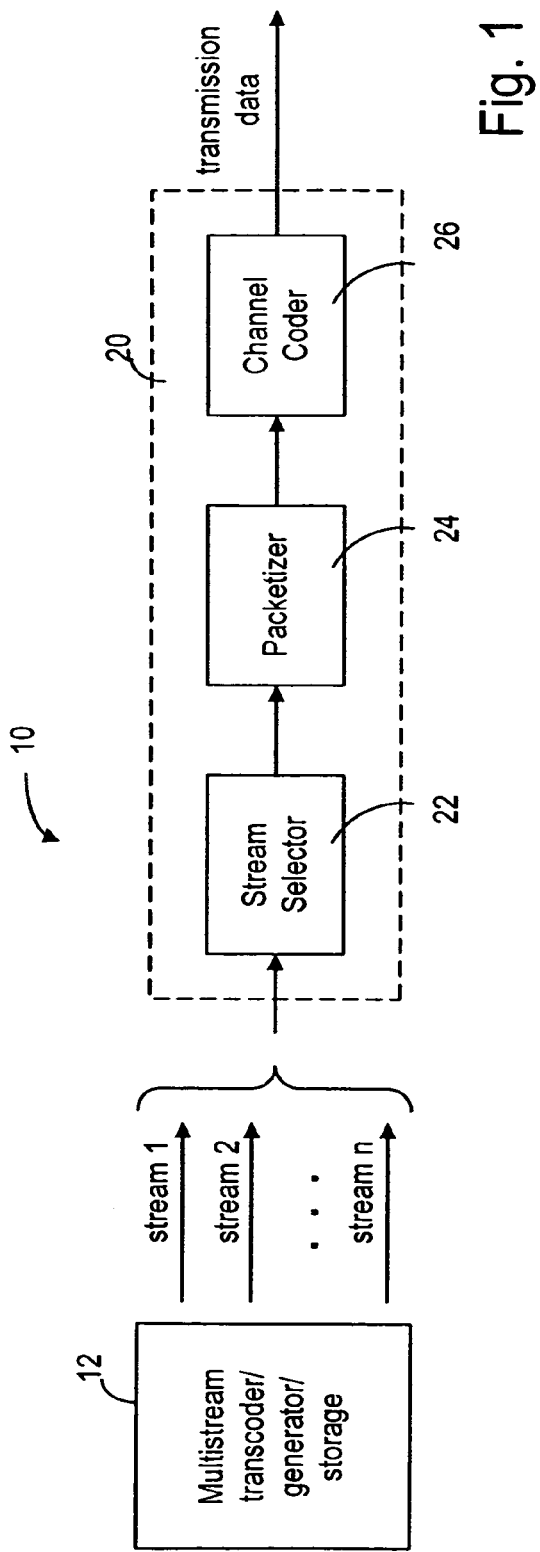
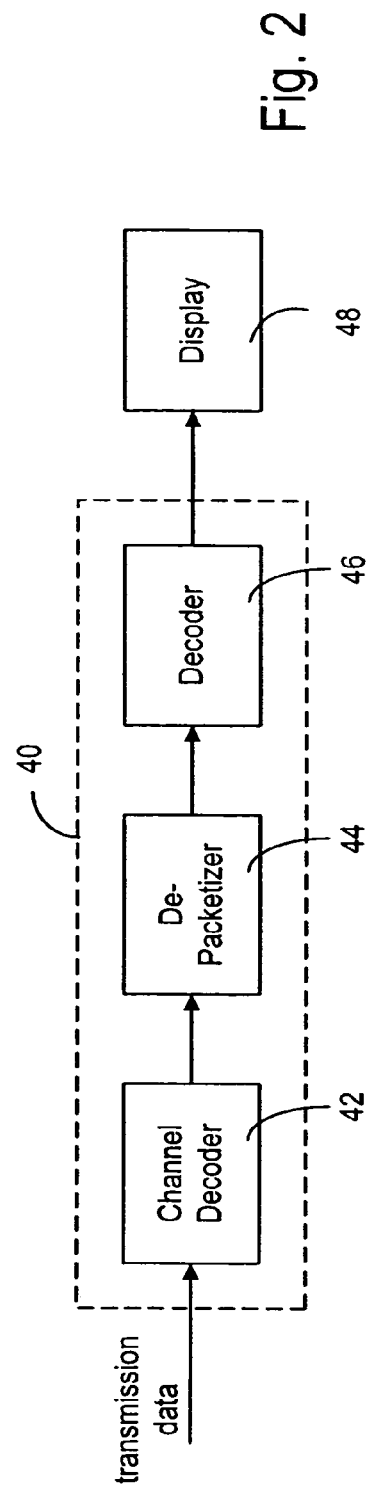

STREAM SWITCHING BASED ON GRADUAL DECODER REFRESH

This is a continuation-in-part application of and claims priority from a U.S. application Ser. No. 10/601,320, filed Jun. 19, 2003 now abandoned. This patent application also claims the priority from an International Application No. PCT/IB03/02787, filed Jul. 11, 2003.

FIELD OF THE INVENTION

The present invention relates generally to video streaming and, more particularly, to stream adaptation in accordance with changing transmission conditions.

BACKGROUND OF THE INVENTION

In video streaming or video-on-demand services, because of the dynamic network conditions, the end-to-end transmission characteristics between the server and the client may change frequently. For example, the transmission bitrate may be reduced. To maintain the continuity of the streaming session and to maximize the Quality of Service, the server should adapt the transmitted stream to the changing transmission conditions. This process is called stream adaptation.

Stream adaptation is either multi-encoding based or transcoding based. In multi-encoding based stream adaptation, the server stores the same video content in a plurality of encoded streams of different forms or with different parameters, and the transmitted data in the encoded streams may be switched between different streams. In transcoding based stream adaptation, the server contains a transcoder to transcode a stream to different forms or with different parameters.

To enable switching from one bitstream to another, the switched-to bitstream must contain switching points, such that the client-side decoder can still receive image data of acceptable decoding quality after switching. Switching points can be random access points or non-random access points. SP/SI pictures can be used for stream switching at non-random access points. Random access points, however, are natural switching points.

Random access refers to the ability of the decoder to start decoding a stream at a point in the stream other than the beginning of the stream, and to recover an exact or approximate representation of the decoded pictures. Thus, a random access point is a switching point where decoding of any following coded picture can be initiated.

A random access point and a recovery point characterize a random access operation. All decoded pictures located at or subsequent to a recovery point in the output order are correct or approximately correct in content. If the random access point is the same as the recovery point, the random access operation is Instantaneous Decoding Refresh (IDR), otherwise it is Gradual Decoding Refresh (GDR). IDR points in a video stream can be used in fast forward and random access, but they can also be used for error resiliency and recovery. IDR is also used in bitrate adaptation by stream switching, especially on the server side.

IDR pictures are pictures that are coded without any reference to other pictures, and all the pictures following an IDR picture in decoding order are coded without reference to any earlier picture than the IDR picture in decoding order, whereas GDR can be implemented using the technique called isolated regions as described later in this document. The picture at a GDR random access point is called a GDR picture. The period from the GDR picture to the recovery point, inclusive, is called the GDR period.

Random access points render it possible to seek operations in locally stored video streams. In video-on-demand or streaming, servers can respond to seek requests by transmitting data starting from the random access point that is closest to the requested destination of the seek operation. Switching between coded streams of different bit-rates is a method that is used commonly in unicast streaming for the Internet to match the transmitted bitrate to the expected network throughput and to avoid congestion in the network. Switching to another stream is possible at a random access point. Furthermore, random access points enable tuning in to a broadcast or multicast. In addition, a random access point can be coded as a response to a scene cut in the source sequence or as a response to an intra picture update request.

File Format

MPEG-4 Part 12 specifies ISO (International Organization for Standardization) base media file format. It is designed to contain timed media information for a presentation in a flexible, extensible format that facilitates interchange, management, editing, and presentation of the media. This presentation may be 'local' to the system containing the presentation, or may be carried out via a network or other stream delivery mechanism. The file structure is object-oriented in that a file can be decomposed into constituent objects, and the structure of the objects can be inferred directly from their type. The file format is designed to be independent of any particular network protocol while enabling efficient support for them in general. ISO base media file format is used as the basis for MP4 file format (MPEG-4 Part 14) and AVC (Advanced Video Coding) file format (MPEG-4 Part 15). AVC file format specifies how AVC content is stored in an ISO base media file format. It is normally used in the context of a specification, such as the MP4 file format, derived from ISO base media file format that permits the use of AVC video.

In the current design of AVC file format, the switching pictures formed by SP/SI pictures are stored in switching tracks, which are tracks separate from the track that is being switched from and the track being switched to. Switching tracks can be identified by the existence of a specific required track reference in that track. A switching picture is an alternative to the sample in the destination track that has exactly the same decoding time.

Each IDR random access point corresponds to a sync sample indicated in the Sync Sample Box. The design of Sync Sample Box is specified in the ISO base media file format as follows:

|            | Definition             |
|------------|------------------------|
| Box Type:  | 'stss'                 |
| Container: | Sample Table Box ('stbl') |
| Mandatory: | No                     |
| Quantity:  | Zero or one            |

This box provides a compact marking of the random access points within the stream. The table is arranged in strictly increasing order of sample number. If the sync sample box is not present, every sample is a random access point.

| Syntax |
|---|
| aligned(8) class SyncSampleBox<br>  extends FullBox('stss', version = 0, 0) {<br>    unsigned int(32) entry_count;<br>    int i;<br>    for (i=0; i < entry_count; i++) {<br>      unsigned int(32) sample_number;<br>    }<br>  } |

Semantics
version is an integer that specifies the version of the box.
entry_count is an integer that gives the number of entries in the following table. If entry_count is zero, there are no random access points within the stream and the following table is empty.
sample_number gives the numbers of the samples that are random access points in the stream.

Isolated Regions

The isolated regions technique provides an elegant solution for many applications, such as GDR (gradual decoding refresh) (JVT-C074), error resiliency and recovery (JVT-C073), region-of-interest coding and prioritization, picture-in-picture functionality, and coding of masked video scene transitions (JVT-C075). With GDR being based on isolated regions, media channel switching for receivers, bitstream switching for the server, and allowing newcomers for multicast streaming will be as easy as instantaneous random access with smoother bitrate.

An isolated region in a picture can contain any macroblock and a picture can contain zero or one isolated region, or more isolated regions that do not overlap. A leftover region is the area of the picture that is not covered by any isolated region of a picture. When coding an isolated region, all predictive coding within the same coded or decoded picture, herein referred to as in-picture prediction, is disabled across its boundaries. A leftover region may be predicted from isolated regions of the same picture.

A coded isolated region can be decoded without the presence of any other isolated or leftover region of the same coded picture. It may be necessary to decode all isolated regions of a picture before the leftover region. An isolated region contains at least one slice.

Pictures, whose isolated regions are predicted from each other, are grouped into an isolated-region picture group. An isolated region can be coupled with a corresponding isolated region in each earlier picture within the same isolated-region picture group. An isolated region can be inter-predicted from the corresponding isolated region within the same isolated-region picture group. However, inter prediction of an isolated region from other isolated regions is disallowed. In contrast, a leftover region may be inter-predicted from any isolated region. The shape, location, and size of coupled isolated regions may evolve from picture to picture in an isolated-region picture group.

Coding of isolated regions can be realized in the AVC codec applying slice groups. Each GDR random access point is characterized by a recovery point Supplemental Enhancement Information (SEI) message. Coding of isolated regions can also be realized in the AVC codec or other standard codecs without using slice groups, though the efficiency may be lower compared to the coding that uses slice groups.

SP/SI Pictures

The AVC coding standard supports SP/SI pictures. It is known that in stream switching involving only P-slices, the decoder will not have the correct decoded reference frames required in image reconstruction. By inserting an I-slice at regular intervals in the coded sequence to create switching points can solve this problem. However, an I-slice is likely to contain much more coded data than a P-slice. As such, a peak in the coded bitrate is resulted at each switching point. SP-slices and SI-slices are designed to support switching without the increased bitrate penalty of I-slices.

An SP/SI picture is encoded in such a way that another SP/SI picture using different reference pictures can have exactly the same reconstructed picture. SP/SI pictures can be applied for bitstream switching, splicing, random access, fast forward, fast backward and error resilience/recovery. For example, let us assume that there are two bitstreams, bs1 and bs2, of different bitrates, originated from the same video sequence. In bs1, an SP picture (s1) is coded, and another SP picture (s2) is coded at the same location in bs2. In bs1, an additional SP picture (s12) is coded having exactly the same reconstructed picture as s2. s12 and s2 use different reference pictures (from bs1 and bs2, respectively). Thus, switching from bs1 to bs2 can be carried out by transmitting s12 instead of s1 in the switching location. Since s12 has exactly the same reconstruction as s2, reconstructed pictures after switching are error-free. The SP picture s12 is called switching picture, which is stored in the switching track in AVC file format.

Streaming System

As mentioned earlier, in multi-encoding based stream adaptation, the server stores in a plurality of encoded streams the same video content, but only one of the encoded streams is selected for transmission. FIG. 1 depicts a transmitting system 10, which includes a server 20 capable of receiving a plurality of streams from a transcoder or multi-stream generator or storage device 12. As shown, the streaming server 20 comprises a stream selector 22 to select one of the encoded streams 1 to n. The selected encoded stream is divided into packets by a packetizer 24 and coded in a channel coder 26 for transmission. To maintain continuity of the streaming session and to maximize the Quality of Service, the server generally selects the best possible encoded stream for transmission. When the transmission condition changes, the server may have to increase or reduce the bitrate, for example. Accordingly, the stream selector switches streams by selecting a different encoded stream at a switching point. At the client side, however, the decoder can simply decode whatever transmission data it receives. Basically, a streaming client device 40 comprises a channel decoder 42, a de-packetizer 44 and a decoder 46 for providing decoded video signals to a display 48 for display, as shown in FIG. 2. However, in a streaming system that supports client-driven stream adaptation, the streaming client device can send a request signal to the server to request switching of the stream. The streaming system is shown in FIG. 3, which shows the connection between a streaming server 20 and a streaming client 40 through a network 60.

Instantaneous/Gradual Decoding Refresh

As mentioned earlier, a random access point is any picture from which decoding can be initiated. At such an access point, all decoded pictures at, or subsequent to, a recovery point are correct or approximately correct in content. It should be noted that the phrase "correct in content" as used in this disclosure means that the decoded slice or picture is exactly the same as when the decoding is started from the beginning of the stream, and the phrase "approximately correct in content" means that the decoded slice or picture is approximately the same as when the decoding is started from the beginning of the bitstream. As shown in FIG. 4a, the recovery point is the same as the switching point, and the pictures with correct or approximately correct in content start at the switching point. As such, the random access operation is referred to as Instantaneous Decoding Refresh (IDR). IDR random access points contain only I slices or SI slices.

In contrast, a Gradual Decoding Refresh (GDR) random access point can contain any kind of slices (I, P, SI, SP). As shown in FIG. 4b, however, the content in the picture is correct or approximately correct starting from a picture following the switching point in the output order. The pictures between the recovery point and the switching point may be visually annoying or otherwise unacceptable for viewing.

Currently, an efficient method to signal GDR switching points to be used in file format is lacking. An example of the file format is AVC file format, which is important for a server file containing streaming content with GDR based video coding to support stream switching. For AVC contents stored in the AVC file format, a GDR switching point can only be identified when an access unit contains a recovery point SEI message, as specified in the AVC standard. This method requires that each AVC access unit be checked to see whether there is a recovery point SEI message.

SUMMARY OF THE INVENTION

The present invention provides an efficient signal method and device for GDR switching points in file format. Furthermore, information on how the GDR is encoded using isolated regions is also signaled so as to achieve faster stream switching and reduced bitrate. With the signaling method of present invention, GDR switching points can be identified as easily as other switching points, such as IDR and SP/SI switching points. In addition, the server can select to transmit only the isolated region, if specified, for the access units from the GDR switching point to the recover point, inclusive, to achieve faster GDR switching and reduced bitrate.

Thus, according to the first aspect of the present invention, there is provided a signaling method for use in stream switching among a plurality of bitstreams, the bitstreams containing video data indicative of a plurality of video frames for each bitstream, wherein the bitstreams comprise at least one switching point so as to allow switching from a first bitstream to a second bitstream at said switching point, and at least one recovery point which defines a first correct or approximately correct picture in output order in the second bitstream decoded subsequent to said stream switching. The method is characterized by providing in association with the bitstreams information on said at least one switching point so that said stream switching can be carried out based on the switching point, wherein the switching point is different from the recovery point.

According to the present invention, the distance between the switching point and the recovery point is also provided in association with the bitstream to be switched to.

Furthermore, the video frames contain at least one isolated region associated with said one or more slices in the second bitstream decoded subsequent to said stream switching, and the provided information may or may not be further indicative of the isolated region.

The stream switching can be initiated by a server device or requested by a client device in a streaming network based on transmission conditions between the server device and the client device.

The signaling method is used in a transmission utilizing Real-time Transport Protocol (RTP), and wherein a Session Description Protocol (SDP) is used to convey information indicative of characteristics of the first and second bitstreams.

According to the second aspect of the present invention, there is provided a streaming server device capable of switching streams among a plurality of bitstreams, the bitstreams containing video data indicative of a plurality of video frames for each bitstream, wherein the bitstreams comprise at least one switching point so as to allow switching from a first bitstream to a second bitstream at said switching point, and at least one recovery point which defines a first correct or approximately correct picture in output order in the second bitstream decoded subsequent to said stream switching. The streaming server device is characterized by a stream selector for selecting the first bitstream for transmission; and means for providing in association with the bitstreams information on said at least one switching point, so as to allow the stream selector to select the second bitstream for transmission based on the switching point, wherein the switching point is different from the recovery point.

Furthermore, the providing means also provides in associated with the second bitstream the distance between the switching point and the recovery point.

According to the third aspect of the present invention, there is provided a streaming system capable of switching stream among a plurality of bitstreams, the bitstreams containing video data indicative of a plurality of video frames for each bitstream, wherein the bitstreams comprise at least one switching point so as to allow switching from a first bitstream to a second bitstream at said switching point, and at least one recovery point which defines a first correct or approximately correct picture in output order in the second bitstream decoded subsequent to said stream switching. The streaming system is characterized by at least one streaming client; and at least one streaming server for transmitting one of the bitstreams to the streaming client so as to allow the streaming client to reconstruct the video frames based on the transmitted bitstream, wherein the streaming server comprises:

a stream selector for selecting the first bitstream for transmission and for further selecting the second bitstream, and means for providing in association with the bitstreams information on said at least one switching point so as to allow the stream selector to select the second bitstream based on the switching point, wherein the switching point is different from the recovery point.

According to the present invention, the providing means also provides in association with the second bitstream the distance between the switching point and the recovery point.

The streaming system is further characterized by a video encoder to convert a video input signal into the video data; and means, responsive to the video data, for encoding the video data into the plurality of bitstreams.

According to the fourth aspect of the present invention, there is provided a software program for use in a streaming system for stream switching among a plurality of bitstreams, the bitstreams containing video data indicative of a plurality of video frames for each bitstream, wherein the bitstreams comprise at least one switching point so as to allow switching from a first bitstream to a second bitstream at said switching point, and at least one recovery point which defines a first correct or approximately correct picture in output order in the second bitstream decoded subsequent to said stream switching. The computer program is characterized by a code for determining said switching point; and a code for indicating information on said switching point in association with the bitstreams, so as to allow a streaming server to carrying out the stream switching based on the switching point, wherein the switching point is different from the recovery point.

According to the present invention, the computer program is further characterized by a code for providing in associated with the second bitstream the distance between the switching point and the recovery point.

The present invention will become apparent upon reading the description taken in conjunction with FIGS. 5 to 7.

BRIEF DESCRIPTION OF THE DRAWINGS

FIG. 1 is a block diagram illustrating a streaming server that supports stream switching.

FIG. 2 is a block diagram illustrating a streaming client.

DETAILED DESCRIPTION OF THE INVENTION

Figure 3:
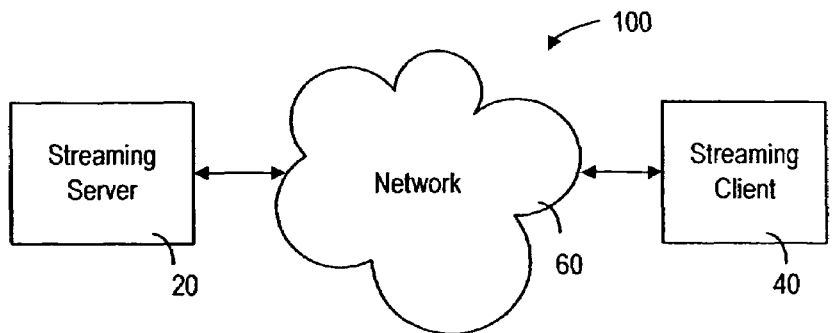
FIG. 3 is a schematic representation of a streaming system.

According to the present invention, information on the switchable GDR pictures is included in a sync sample information box (ssif) that is contained in the sync sample box so as to indicate the random access points (hence switching points). Furthermore, if slice groups are used to realize isolated regions, the slice groups need to be associated to the isolated region and to the leftover region in the ssif Using this information, the streaming server can use the GDR picture to correctly switch streams. Using GDR pictures in switching, the information of the picture in the switching point can be transmitted faster than that for IDR pictures, because the leftover region in a GDR picture does not need to be sent. Though using GDR pictures for switching the users may see only part of the picture area at beginning, they could be happier if they can see something as soon as possible. In addition, the leftover region in a picture from the GDR switching point to the recovery point, inclusively, does not need to be sent. As such, reduced transmission rate is achieved as compared to when both the isolated region and the leftover region are sent.

The implementation of the present invention in AVC file format is characterized in that each random access point is a switching point. The first embodiment of the implementation of the present invention is as follows.

All random access points, including both IDR random access points (IDR access units) and GDR random access points (access units containing recovery point SEI messages with the syntax element changing_slice_group_idc equal to 1 or 2), are marked in Sync Sample Box. In addition, a Sync Sample Information Box (contained in sync sample box) is defined as follows:

| | Definition |
|---|---|
| Box Type: | 'ssif' |
| Container: | Sync Sample Box ('stss') |
| Mandatory: | No |
| Quantity: | Zero or one |

This box provides information of the random access points within the stream. The information includes whether a random access point is a GDR or an IDR random access point. If the random access point is a GDR point, the information also includes which slice group is the isolated region and which slice group is the leftover region, and the distance between the GDR point and the corresponding recovery point. If the sync sample box does not contain a sync sample information box, all the sync samples marked by the sync sample box are IDR random access points.

| Syntax |
|---|
| aligned(8) class SyncSampleInformationBox<br>  extends FullBox('ssif', version = 0, 0) {<br>  int i;<br>  for (i=0; i < entry_count; i++) {<br>    unsigned int(2) random_access_point_idc;<br>    bit(6) reserved = '111111'b;<br>    if(random_access_point_idc != 0)<br>      unsigned int(16) roll-distance;<br>  }<br>} |

Semantics version is an integer that specifies the version of this box.

random_access_point_idc :

0 indicates that the random access point is an IDR random access point;

1 indicates that the random access point is a GDR random access point, and within the GDR period the isolated region is covered by slice group 0 while the leftover region is covered by slice group 1;

2 indicates that the random access point is a GDR random access point, and within the GDR period the isolated region is covered by slice group 1 while the leftover region is covered by slice group 0;

3 is not allowed.

roll-distance indicates the number of samples from the GDR random access point (exclusive) to the corresponding recovery point (inclusive).

The second embodiment of the implementation of the present invention is as follows. All random access points, including both IDR random access points (IDR access units) and GDR random access points (access units containing recovery point SEI messages), are marked in Sync Sample Box. In addition, a Sync Sample Information Box (contained in sync sample box) is defined as follows:

| | Definition |
|---|---|
| Box Type: | 'ssif' |
| Container: | Sync Sample Box ('stss') |
| Mandatory: | No |
| Quantity: | Zero or one |

This box provides information of the random access points within the stream. The information includes whether a random access point is a GDR or an IDR random access point. If the random access point is a GDR picture, the information includes whether the slice groups are applied in coding the pictures within the GDR period. If the random access point is a GDR picture and slice groups are applied in coding the pictures within the GDR period, the information also includes which slice group covers the isolated region and which slice group covers the leftover region within the GDR period, and the distance between the GDR point and the corresponding recovery point. If the sync sample box does not contain a sync sample information box, all the sync samples marked by the sync sample box are IDR random access points.

| Syntax |
| --- |
| aligned(8) class SyncSampleInformationBox<br>  extends FullBox('ssif', version = 0, 0) {<br>    int i;<br>    for (i=0; i < entry_count; i++) {<br>      unsigned int(2) random_access_point_idc;<br>      bit(6) reserved = '111111'b;<br>      if(random_access_point_idc != 0)<br>        unsigned int(16) roll-distance;<br>    }<br>  } |

Semantics
- version is an integer that specifies the version of this box.
- random_access_point_idc:
  - 0 indicates that the random access point is an IDR random access point;
  - 1 indicates that the random access point is a GDR random access point, and within the GDR period the isolated region is covered by slice group 0 while the leftover region is covered by slice group 1;
  - 2 indicates that the random access point is a GDR random access point, and within the GDR period the isolated region is covered by slice group 1 while the leftover region is covered by slice group 0;
  - 3 indicates that the random access point is a GDR random access point, and within the GDR period it is unspecified which slices cover the isolated region and which slices cover the leftover region.
- roll-distance indicates the number of samples from the GDR random access point (exclusive) to the corresponding recovery point (inclusive).

With the signaling methods, according to the present invention, all switching points can be explicitly marked so that the stream server does not need to parse each picture to find the switching points. If there are no GDR switching points, the Sync Sample Information Box (contained in the Sync Sample Box) does not need to be used.

Figure 5:
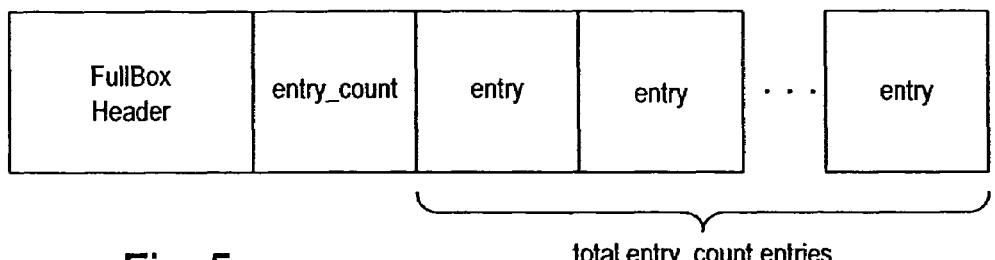
FIG. 5 is a block diagram illustrating a sync sample box.
Figure 6:
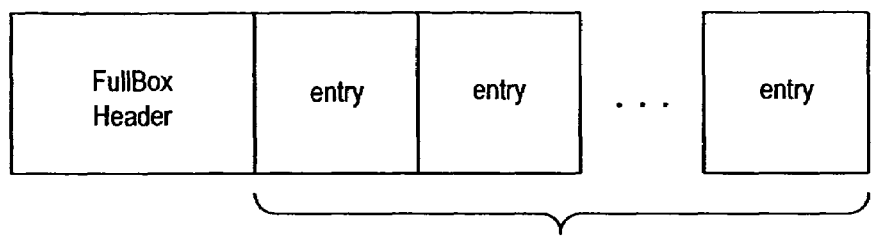
FIG. 6 is a block diagram illustrating a sync sample information box, according to the present invention.
Figure 4A:
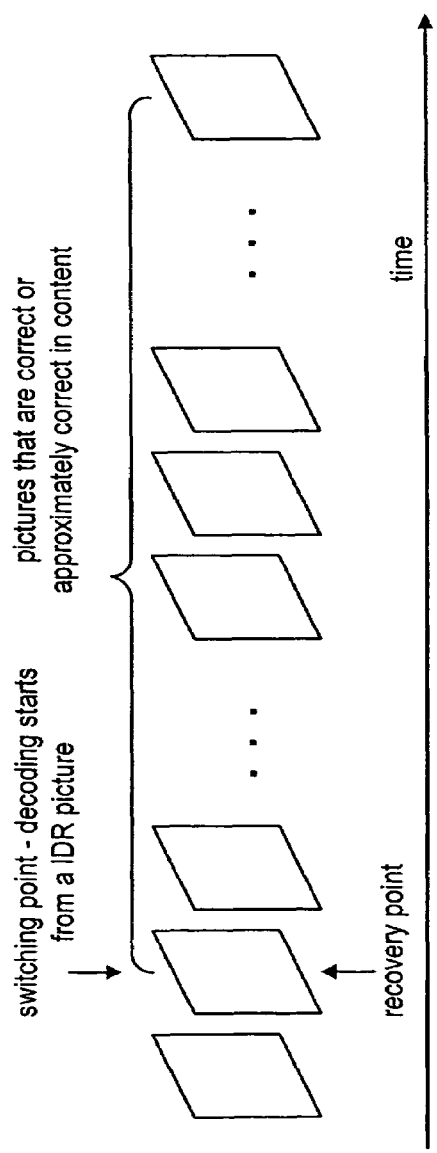
FIG. 4a is a schematic representation illustrating stream switching using an instantaneous decoder refresh picture.
Figure 4B:
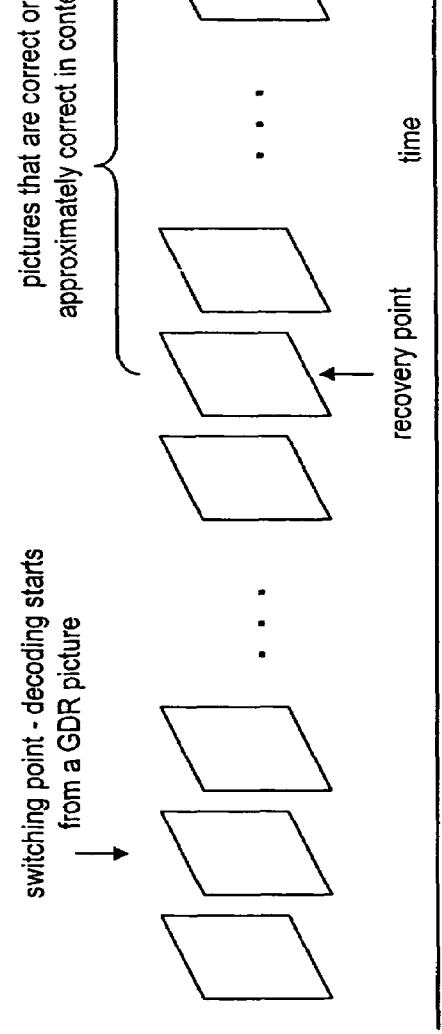
FIG. 4b is a schematic representation illustrating stream switching using a gradual decoder refresh picture.

An exemplary Sync Sample Box is shown in FIG. 5 and an exemplary Sync Sample Information Box is shown in FIG. 6.

Figure 7:
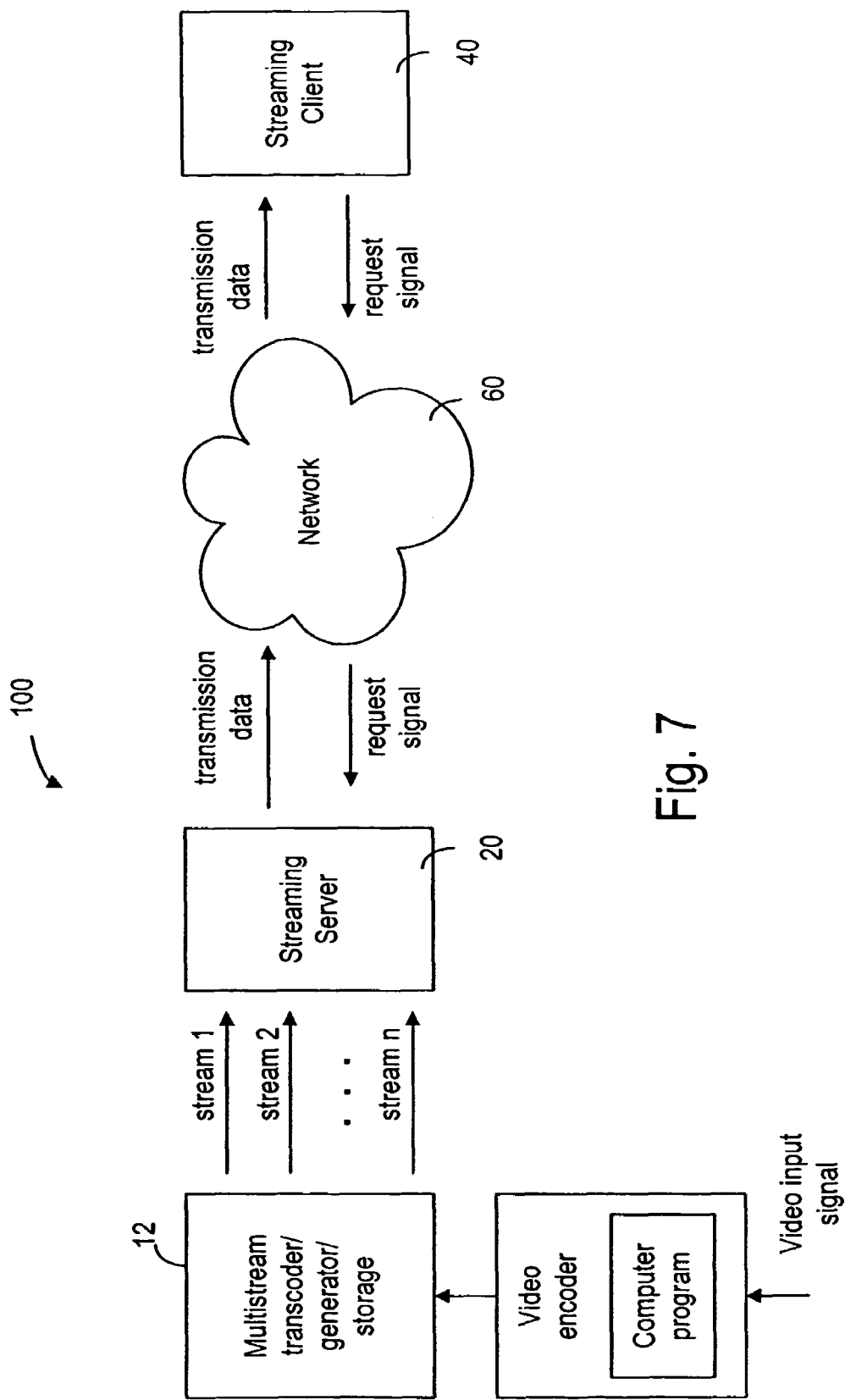
FIG. 7 is a schematic representation illustrating a streaming system, according to the present invention.

According to the present invention, a computer program is used in the streaming system to provide information on the switchable GDR pictures in a Sync Sample Information Box that is contained in a Sync Sample Box. The information includes the switching points. In addition, the computer program also specifies the slice groups that are associated to the isolation region and to the leftover region, if the information is available. Such a computer program is denoted by reference numeral 16, as shown in FIG. 7. The computer program 16 is part of a video coder 14, which provides encoded video input signal and GDR related information to the multi-stream transcoder/generator 12. The stream server 20 is capable of selecting one of the encoded streams for transmission, based on the dynamic network conditions in the network 60. If the end-to-end transmission characteristics between the streaming server 20 and the streaming client 40 have changed, the streaming server 20 may initiate stream switching in that the streaming server chooses another encoded stream, according with the GDR related information provided in the Sync Sample Information Box. Alternatively, the streaming client 40 may send a request signal to the streaming server 20, requesting a different transmitted stream if the streaming client 40 detects a change in the transmission conditions in the network 60.

The GDR signaling method, according to the present invention, can be used in video data transmission using Real-time Transport Protocol (RTP), and a Session Description Protocol (SDP) can be used to convey information indicative of the characteristics of bitstreams in stream switching. As it is known, RTP provides end-to-end network transport functions suitable for applications transmitting real-time data, such as audio, video or simulation data, over multicast or unicast network services. RTP does not address resource reservation and does not guarantee quality-of-service (QoS) for real-time services. The data transport is augmented by a control protocol (RTCP) to allow monitoring of the data delivery in a manner scalable to large multicast networks, and to provide minimal control and identification functionality. RTP and RTCP are designed to be independent of the underlying transport and network layers. The protocol supports the use of RTP-level translators and mixers. The Session Description Protocol (SDP) is intended for describing multimedia sessions for the purposes of session announcement, session invitation, and other forms of multimedia session initiation. SDP can be used, for example, by the server to notify the client what bitrate alternatives of a bistream are available.

The GDR signaling method, according to the present invention, is applicable to the video coding standard ITU-T H.264 (also known as MPEG-4 Part 10 or AVC) developed by the Joint Video Team (JVT). However, the application of the present invention is not limited to the above-mentioned AVC standard. The present invention may also be applied to other video coding standards and devices. For example, for other video coding standards that support coding of slices, such as H.263 and MPEG-4 Part 2, the isolated region can cover the first row of macroblocks in the GDR picture and all the macroblocks in other rows are covered by the leftover region. The isolated region grows in the subsequent pictures in the speed of one macroblock per row (while at the same time the leftover region decrease at the same speed) until it covers the entire picture region in the recovery point picture. The isolated region in each picture within the GDR period can be coded as one or more slices. The coding limitations of the isolated region as described earlier are also applied during the encoding process. In such cases or other similar cases, the GDR signaling method, according to the present invention, is applicable.

Thus, although the invention has been described with respect to preferred embodiments thereof, it will be understood by those skilled in the art that the foregoing and various other changes, omissions and deviations in the form and detail thereof may be made without departing from the scope of this invention.

What is claimed is:

1. A signaling method for use in stream switching among a plurality of bitstreams, comprising:

providing in association with the bitstreams information on a switching point at which a first bitstream is caused to switch to a second bitstream, the bitstreams comprising video data indicative of a plurality of video frames, and at least one recovery point which defines a first correct or approximately correct picture in output order in the second bitstream decoded subsequent to said stream switching, and providing in association with the second bitstream a distance between the switching point and the recovery point, wherein the switching point is different from the recovery point.

2. The signaling method of claim 1, wherein each video frame comprises one or more slices and the video frames contain at least one isolated region associated with said one or more slices in the second bitstream decoded subsequent to said stream switching, and wherein the provided information is farther indicative of the isolated region.

3. The signaling method of claim 1, wherein the bitstreams are conveyed from a server device to a client device in a streaming network, and wherein said stream switching is initiated by the server device.

4. The signaling method of claim 1, wherein the bitstreams are conveyed from a server device to a client device in a streaming network, and wherein said stream switching is requested by the client device.

5. The signaling method of claim 1, wherein the signaling method is used in a transmission utilizing Real-time Transport Protocol.

6. The signaling method of claim 4, wherein a Session Description Protocol is used to convey information indicative of characteristics of the first and second bitstreams.

7. The signaling method of claim 1, wherein said stream switching is carried out in transmission of the video data based on transmission conditions between a server device and a client device in a streaming network.

8. A streaming server device adapted for stream switching among a plurality of bitstreams, comprising:
 a stream selector configured for selecting from the bitstreams a first bitstream for transmission, wherein the bitstreams comprise at least one switching point at which the first bitstream is caused to switch to a second bitstream, the bitstreams comprising video data indicative of a plurality of video frames, and at least one recovery point which defines a first correct or approximately correct picture in output order in the second bitstream decoded subsequent to said stream switching; and
 a module for providing in association with the bitstreams information on said at least one switching point and providing in association with the second bitstream a distance between the switching point and the recovery point, wherein the stream selector is further configured to select the second bitstream for transmission based on the switching point, and wherein the switching point is different from the recovery point.

9. The streaming server device of claim 8, wherein each video frame comprises one or more slices and the video frames contain at least one isolated region associated with said one or more slices in the second bitstream decoded subsequent to said stream switching, and wherein the provided information is further indicative of the isolated region.

10. The streaming server device of claim 8, wherein the provided information is used in data transmission utilizing Real-time Transport Protocol.

11. The streaming server device of claim 10, wherein a Session Description Protocol is used to convey information indicative of characteristics of the first and second bitstreams.

12. The streaming server device of claim 8, wherein said stream selector selects the second bitstream for stream switching based on transmission conditions between the streaming server device and a client device in a streaming network.

13. A streaming system adapted for stream switching among a plurality of bitstreams, comprising:
 at least one streaming client; and
 at least one streaming server for transmitting one of the bitstreams to the streaming client, the bitstreams comprising video data indicative of a plurality of video frames, the streaming client configured to reconstruct the video frames based on the transmitted bitstream, wherein the bitstreams comprise at least one switching point at which a first bitstream is caused to switch to a second bitstream, and at least one recovery point which defines a first correct or approximately correct picture in output order in the second bitstream decoded subsequent to said stream switching, wherein the streaming server comprises:
  a stream selector for selecting from the bitstreams the first bitstream for transmission and for further selecting the second bitstream, and
  a module adapted for providing in association with the bitstreams information on said at least one switching point and providing in association with the second bitstream a distance between the switching point and the recovery point, wherein the switching point is different from the recovery point.

14. The streaming system of claim 13, wherein each video frame comprises one or more slices and the video frames contain at least one isolated region associated with said one or more slices in the second bitstream decoded subsequent to said stream switching, and wherein the provided information is further indicative of the isolated region.

15. The streaming system of claim 13, wherein said stream switching is initiated by the streaming server.

16. The streaming system of claim 13, wherein said stream switching is requested by the streaming client.

17. The streaming system of claim 13, wherein the provided information is used in data transmission utilizing Real-time Transport Protocol.

18. The streaming system of claim 17, wherein a Session Description Protocol is used to convey information indicative of characteristics of the first and second bitstreams.

19. The streaming system of claim 13, wherein said stream selects the second bitstream for stream switching based on transmission conditions between the streaming server and the streaming client.

20. The streaming system of claim 13, further comprising:
 a video encoder to convert a video input signal into the video data; and
 a coding module, responsive to the video data, for encoding the video data into the plurality of bitstreams.

21. A computer readable storage medium embodied with a software program for use in a streaming system for stream switching among a plurality of bitstreams, said software program comprising:
 a code for determining a switching point at which a first bitstream is caused to switch to a second bitstream, the bitstreams comprising video data indicative of a plurality of video frames, and at least one recovery point which defines a first correct or approximately correct picture in output order in the second bitstream decoded subsequent to said stream switching; and a code for providing in association with the bitstreams information indicating said switching point and providing in association with the second bitstream a distance between the switching point and the recovery point, wherein the switching point is different from the recovery point.

22. The computer readable storage medium of claim 21, wherein each video frame comprises one or more slices and the video frames contain at least one isolated region associated with said one or more slices in the second bitstream decoded subsequent to said stream switching, and wherein the provided information is further indicative of the isolated region.

23. The computer readable storage medium of claim 21, wherein the provided information is used in data transmission utilizing Real-time Transport Protocol.

24. The computer readable storage medium of claim 21, wherein a Session Description Protocol is used to convey information indicative of characteristics of the first and second bitstreams.

* * * * *

UNITED STATES PATENT AND TRADEMARK OFFICE
CERTIFICATE OF CORRECTION

PATENT NO. : 7,552,227 B2
APPLICATION NO. : 10/848966
DATED : June 23, 2009
INVENTOR(S) : Ye-Kui Wang It is certified that error appears in the above-identified patent and that said Letters Patent is hereby corrected as shown below:

In column 11, line 18, claim 2, line 6 "farther" should be --further--.

Signed and Sealed this

Twenty-seventh Day of October, 2009

David J. Kappos
*Director of the United States Patent and Trademark Office*